Figure 1:
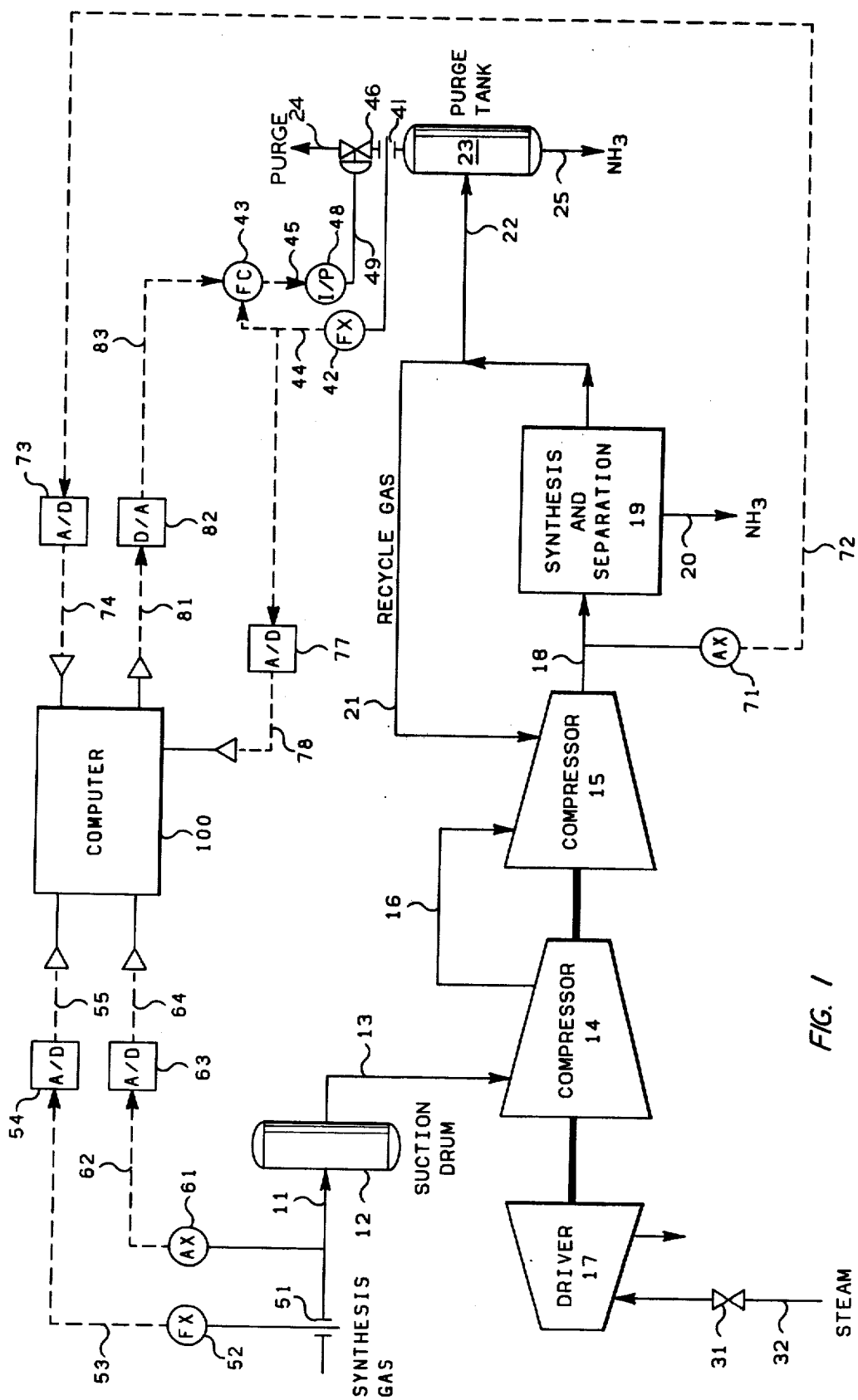

United States Patent [19]

Gaines et al.

[11] 4,180,858
[45] Dec. 25, 1979

[54] PURGE CONTROL FOR AMMONIA SYNTHESIS PROCESS

[75] Inventors: Larry D. Gaines, Bartlesville, Okla.; Richard F. Giles, Pinch, Va.

[73] Assignee: Phillips Petroleum Company, Bartlesville, Okla.

[21] Appl. No.: 938,188

[22] Filed: Aug. 30, 1978

[51] Int. Cl.$^2$ .................. G06G 7/58; G05B 17/00
[52] U.S. Cl. .................. 364/502; 23/230 A; 364/116; 422/62; 423/359
[58] Field of Search ........... 364/500, 502, 116, 105, 364/106, 118; 23/230 R, 230 A, 232 R, 232 C, 232 E; 422/62, 148, 109; 423/359

[56] References Cited

U.S. PATENT DOCUMENTS

| | | |
|---|---|---|
| 3,754,125 | 8/1973 | Rothstein .................. 23/253 A X |
| 4,054,780 | 10/1977 | Bartley et al. .................. 364/106 |
| 4,094,959 | 6/1978 | Ball et al. .................. 364/500 X |
| 4,115,862 | 9/1978 | Stewart .................. 364/500 |

*Primary Examiner*—Joseph F. Ruggiero

[57] ABSTRACT

Control of the inerts concentration level in the synthesis loop of an ammonia synthesis process is accomplished by using process measurements to provide a continuous estimation of the inerts concentration level in the synthesis loop. This estimation is utilized to provide feed forward control of the purge rate. A chromatographic analyzer is utilized to measure the actual inerts concentration level in the synthesis loop. The actual measured inerts concentration level is utilized to correct the estimation of the inerts concentration level at the sample times of the chromatographic analyzer to provide feedback control of the purge rate.

12 Claims, 2 Drawing Figures

PURGE CONTROL FOR AMMONIA SYNTHESIS PROCESS

This invention relates to control of an ammonia synthesis process. In a specific aspect this invention relates to method and apparatus for controlling the inerts concentration level in the synthesis loop of an ammonia synthesis process.

In typical ammonia processes only minor quantities of the inerts which are contained in the feed stream are removed in the product stream and the buildup of inerts in the synthesis loop becomes a problem. The flow rate of a purge stream can be varied to control this buildup. It is desirable to maintain the inerts level in the synthesis loop as high as possible by using as small a purge flow rate as possible. In this manner, less reactants are lost in the purge stream and ammonia production is increased at a constant feed level. There is, however, a level of inerts concentration above which the reactor is quenched. Ideally then, the inerts level should be held just below this maximum concentration.

In the past, the purge flow rate in an ammonia synthesis process was typically manipulated manually to control the inerts concentration level in the synthesis loop of the ammonia synthesis process. With the addition of a process chromatograph to provide an actual measurement of the inerts concentration level in the synthesis loop, the operator could better control the concentration level since an accurate online measurement could be quickly obtained. The next step was to use the chromatographic analyzer signal for closed loop inerts control, and this has become a standard situation in ammonia synthesis processes today.

The use of a chromatographic analyzer to measure the inerts concentration level in the synthesis loop introduced sampling and dead time effects which are well known to be destabilizing in comparison to the quality of control which could be achieved if measurement dead time could be eliminated. The sampling time for a chromatographic analyzer may be typically in the range of about three minutes and it may take an equal amount of time to get the sample from the ammonia synthesis process to the chromatographic analyzer. Thus, for a substantial period of time the purge flow rate will be controlled in response to an old analysis of the inerts concentration level in the synthesis loop. The inerts concentration level in the synthesis loop may have changed substantially during this time which means that the purge rate is being controlled in response to a measurement which was accurate at the sample time but which is not accurate during the time between sample times. It is thus necessary to control the inerts concentration level at a point substantially below the level at which the reactor would be quenched to avoid an inerts concentration buildup between the sample times which would quench the reactor but which would not be sensed by the control system in time for the purge rate to be increased to reduce the inerts concentration level.

It is thus an object of this invention to provide method and apparatus for controlling the inerts concentration level in the synthesis loop of an ammonia synthesis process. It is a specific object of this invention to provide method and apparatus for using process measurements to provide a continuous estimation of the inerts concentration level in the synthesis loop while using an actual measurement of the inerts concentration level in the synthesis loop to periodically correct the estimation.

In accordance with the present invention, method and apparatus are provided whereby measurements of the feed flow rate, purge flow rate and feed inerts level are utilized to provide a continuous estimation of the inerts concentration level in the synthesis loop. A chromatographic analyzer is used to provide an actual measurement of the inerts concentration level in the synthesis loop. The actual measurement of the inerts concentration level is utilized to correct the estimation of the inerts concentration level at each sample time of the chromatographic analyzer. In this manner feed forward control is provided by the estimation of the synthesis loop inerts level and feedback control is provided by the actual measurement of the synthesis loop inerts level. The sampling and dead time delays introduced by the chromatographic analyzer are avoided and the destabilizing effect of these delays is thus reduced. In this manner a higher quality of control is achieved because the control system can be tuned to provide tighter control of the inerts concentration level in the synthesis loop without destabilizing the control system.

Figure 2:
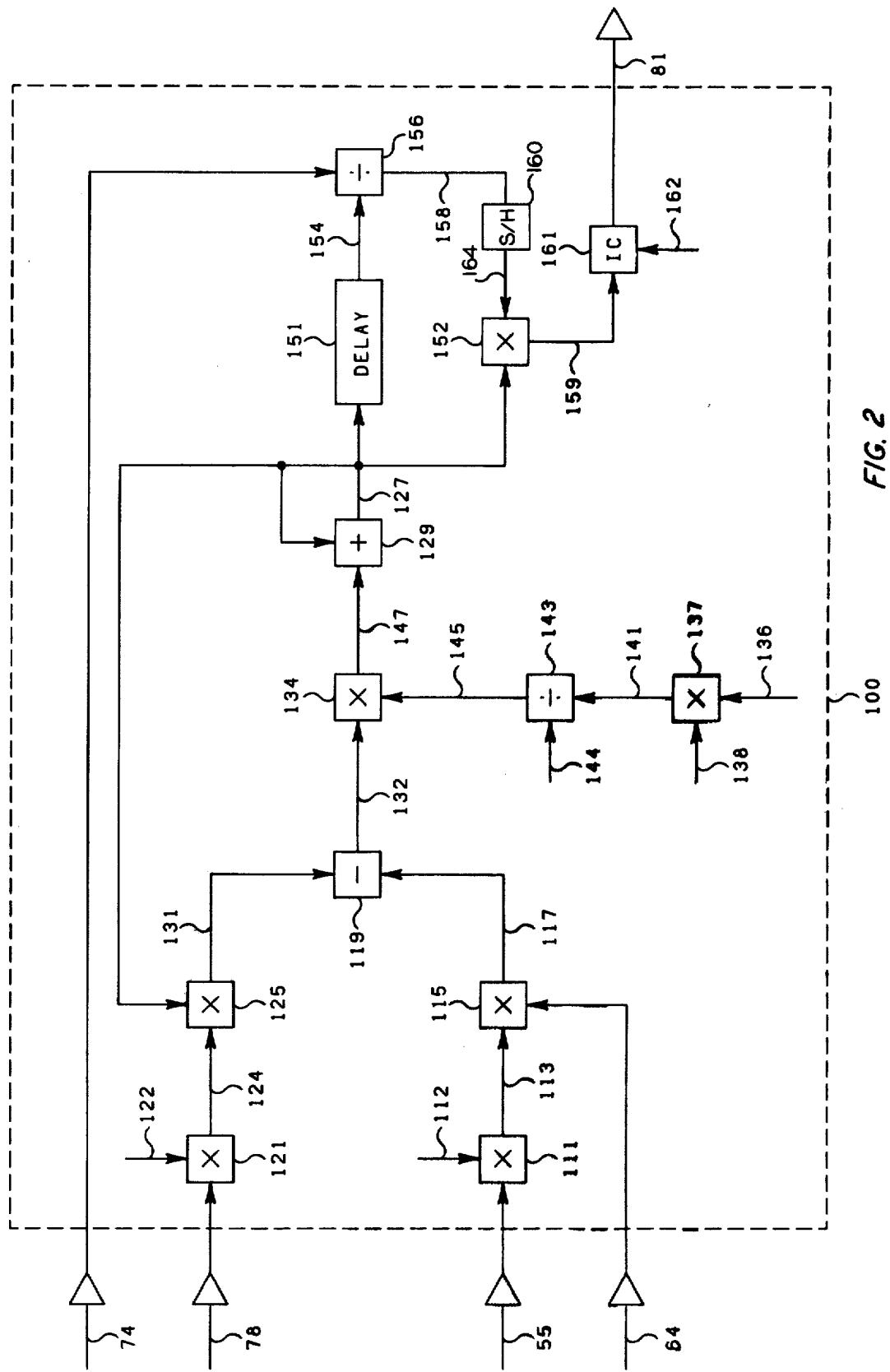

Other objects and advantages of the invention will be apparent from the detailed description of the invention and the appended claims as well as from the detailed description of the drawings in which:

FIG. 1 is a representation of a process for the manufacture of ammonia with the associated means for controlling the ammonia synthesis process; and FIG. 2 is a flow diagram of the control logic utilized in the present invention.

Although the invention is illustrated and described in terms of a specific ammonia synthesis process, the applicability of the invention described herein extends to other ammonia synthesis process configurations and also extends to different types of control system configurations which accomplish the purpose of the invention. Lines designated as signal lines in the drawings are electrical in this preferred embodiment. However the invention is also applicable to pneumatic, mechanical, hydraulic or other signal means for transmitting information. In almost all control systems some combination of these types of signals will be used. However, use of any other type of signal transmission, compatible with the process and equipment in use, is within the scope of the invention.

The controller shown may utilize the various modes of control such as proportional, proportional-integral, proportional-derivative, or proportional-integral-derivative. In this preferred embodiment a proportional-integral controller is utilized. The operation of this type of controller is well known in the art. The output control signal of a proportional-integral controller may be represented as $$S = K_1 E + K_2 \int E \, dt$$

where

S = output control signal;
E = difference between two input signals; and
$K_1$ and $K_2$ = constants.

The various transducing means used to measure parameters which characterize the ammonia synthesis process and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic control elements such as pneumatically operated control valve means 46 in conjunction with electrical signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a low (or high) measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, a synthesis gas containing hydrogen and nitrogen in the approximate mol ratio of 3:1 is obtained from any suitable source and fed through synthesis gas conduit means 11 into suction drum 12. The synthesis gas will also contain a small quantity of gases (primarily methane and argon) which are inert gases in the ammonia synthesis process. From suction drum 12 the synthesis gas is fed through conduit means 13 into the first stage compressor means 14 and from compressor means 14 through conduit means 16 into the second stage compressor means 15. This two-stage compression system which is powered by driver means 17 compresses the synthesis gas to a high pressure. Recycle gas is mixed with the synthesis gas in compressor means 15 and the compressed mixture is fed through conduit means 18 into a separation and synthesis zone 19. There the compressed mixed gas is cooled in the separation portion of the synthesis and separation zone 19 to condense out any ammonia product as a liquid. The ammonia product is withdrawn from the process through conduit means 20. A very small portion of the inert gases contained in the synthesis gas may be present in the ammonia product. The remaining synthesis gas is passed in contact with a suitable catalyst under suitable reaction conditions for the formation of ammonia in the synthesis portion of the synthesis and separation zone 19.

All the hydrogen and nitrogen will not be converted to ammonia. The remaining unreacted gases together with the ammonia gas which has been formed in the synthesis portion of the synthesis and separation zone 19 are withdrawn from the synthesis and separation zone 19 and most of the thus withdrawn gases are passed through recycle gas conduit means 21 as recycle gas to be mixed with fresh synthesis gas in compressor means 15. The recycle gas will also contain most of the inert gases introduced into the synthesis gas. In order to avoid a buildup of these inert gases in the recycle gas to such an extent that their partial pressure effect becomes deleterious to the reaction, a portion of the recycle gas is intermittently or continuously purged from the system through purge gas conduit means 22 into purge tank 23. Purge gas is vented through conduit means 24 and any ammonia condensing out from the purge gas is withdrawn from purge tank 23 through conduit means 25.

The loop formed by the two stage compression system formed by compressor means 14 and 15, the synthesis and separation zone 19 and conduit means 21 for passing the recycle gas to the second stage of the two stage compressor system will be referred to as the synthesis loop.

The rate of flow of steam to the driver means 17 through conduit means 32 determines the speed at which compressor means 14 and compressor means 15 will be driven. The rate at which steam is provided to the driver 17 is controlled by control valve 31 located in steam conduit means 32. A constant compressor speed, usually near the maximum RPM for the compressors, is usually desirable.

Flow sensor 51 together with flow transducer 52 provide a signal 53, representative of the feed flow rate of the synthesis gas flowing through conduit means 11, to the analog to digital (A/D) converter 54. The A/D converter 54 converts the signal 53, which is in analog form, to a digital representation which is illustrated as signal 55. Signal 55, which is representative of the feed flow rate of the synthesis gas flowing through conduit means 11, is provided from the A/D converter 54 as one input to the computer means 100. Analyzer transducer 61 provides a signal 62, which is representative of the concentration of the inerts in the synthesis gas flowing through conduit means 11, to the A/D converter 63. Signal 62 is converted to digital form by the A/D converter 63 and is provided as signal 64 to computer means 100.

Analyzer transducer 71 provides an output signal 72 which is representative of the actual concentration of inerts in the portion of the synthesis loop between compressor means 15 and synthesis and separation zone 19. Analyzer transducer 71 could also be located so as to provide an analysis of the recycle gas flowing through conduit means 21 in which case signal 72 would be representative of the actual concentration of inerts in the recycle gas. If the analyzer transducer 71 is located as illustrated in FIG. 1, then a correction factor must be utilized to transform signal 72 into a signal equal to the actual concentration of inerts in the recycle gas. Signal 72 is provided from the anaylzer transducer 71 to the A/D converter 73. The A/D converter 73 converts signal 72 to digital form and provides signal 74 to the computer means 100.

Flow sensor 41, which is located in conduit means 24, together with flow transducer 42 provide a signal 44 which is representative of the actual purge flow rate through conduit means 24. Signal 44 is provided from flow transducer 42 to the A/D converter 77. The A/D converter 77 converts signal 44 to digital form and provides signal 78, representative of the actual purge flow rate through conduit means 24, to computer means 100.

In response to the described input process measurements, the computer means 100 provides an output signal 81 representative of the required purge flow rate necessary to maintain the concentration of inerts in the synthesis loop at a desired level just below the level of the inerts concentration at which the reactor is quenched. Signal 81 is provided from computer means 100 to the digital to analog (D/A) converter 82. The D/A converter 82 converts signal 81 to analog form and provides the converted signal 83 as a first input to the flow controller 43.

Signal 44 is also provided from flow transducer 42 as a second input to the flow controller 43. In response to signals 44 and 83 the flow controller 43 provides an output signal 45 which is responsive to the difference between the actual purge flow rate which is represented by signal 44 and the desired purge flow rate which is represented by signal 83. Signal 45 is provided from the flow controller 43 to the current to pressure transducer 48. The current to pressure transducer 48 converts signal 45 to pneumatic form and provides a control signal 49 to the pneumatic control value 46 which is operably located in conduit means 24. The pneumatic control valve 46 is manipulated in response to signal 49 to control the purge flow rate through conduit means 24 at the desired flow rate represented by signal 83.

As has been previously stated, the purge flow rate through conduit means 24 is preferably maintained at a level which will hold the inerts concentration level in the synthesis loop just below the concentration at which the reactor is quenched. In this manner the control system illustrated in FIG. 1 allows less reactants to be lost in the purge stream flowing through conduit means 24 thus increasing ammonia production at a constant feed level.

A digital computer is preferably utilized to calculate the desired purge flow rate in response to the measured system inputs. An analog computer could also easily be used to perform the required calculations. The digital logic utilized in computer means 100 illustrated in FIG. 1 is illustrated in FIG. 2.

The following development of control signal 81, illustrated in FIG. 1, is provided to clarify the logic flow diagram illustrated in FIG. 2. The concentration of inerts in the synthesis loop at any given time n may be estimated by using the following equation:

$$I_n = I_{n-1} + [(IF)(G_1)(FR) - (I_{n-1})(G_2)(PR)][(G_3)(SI)/C] \quad (I)$$

where $I_n$ = concentration of inerts at time n;
$I_{n-1}$ = concentration of inerts at time n−1;
IF = concentration of inerts in the synthesis feed to synthesis and separation;
FR = flow rate of fresh synthesis feed;
PR = flow rate of purge;
SI = computer sample interval;
C = capacity of synthesis loop; and
$G_1$, $G_2$, and $G_3$ are gain terms.

The term (IF)($G_1$)(FR) is representative of the inerts being added to the recycle gas from the feed stream per unit time. The gain term $G_1$ is preferably set to 0.9 because some of the inerts contained in the feed and represented by IF will be removed with the product through conduit means 20, illustrated in FIG. 1. The gain term $G_1$ is utilized to compensate for the inerts lost through conduit means 20.

The term ($I_{n-1}$)($G_2$)(PR) is representative of the inerts being removed from the recycle gas by the purge stream per unit time. The gain term $G_2$ is preferably set to 1.1 because the analysis of the concentration of inerts in the synthesis loop is performed before the reaction in the synthesis and separation zone 19 illustrated in FIG. 1. The concentration of the inerts in the synthesis loop will go up after the reaction and this factor is accounted for by the use of the gain term $G_2$.

The term ($G_3$) (SI)/C is a term which compensates for the volume or capacity of the synthesis loop and the sample time of computer means 100. The units on the term ($G_3$)(SI)/C are such that the units on equation (I) work out to be %. The gain term $G_3$ is preferably set to 1.0 in the preferred embodiment of the present invention. However, the gain term $G_3$ may be varied if the number used for the capacitance of the synthesis loop does not prove to be accurate.

As is illustrated in equation I, the estimated value for the concentration of the inerts in the synthesis loop $I_n$ is obtained by adding any change caused by a change in the flow rate of the feed, the concentration of the inerts in the feed, or the purge rate to the concentration of the inerts estimated at a time n−1. The estimated concentration of the inerts in the synthesis loop $I_{n-x}$, where $I_{n-x}$ corresponds to estimated concentration when the sample $I_m$ was taken, is compared to the measured concentration of inerts in the synthesis loop $I_m$ to provide a corrected updated value for the concentration of inerts in the synthesis loop at each sample period of the analyzer transducer 71 illustrated in FIG. 1. The estimated value for the concentration of the inerts in the synthesis loop $I_n$ is utilized for feed forward control of the purge rate while the measured value for the concentration of inerts in the synthesis loop $I_m$ is utilized for feedback control of the purge rate. The estimated concentration of inerts in the synthesis loop, as corrected by the measured value of the concentration of inerts in the synthesis loop, is compared to a set point representative of the maximum allowable concentration of inerts in the synthesis loop to provide signal 81, illustrated in FIG. 1, which is representative of the desired flow rate of the purge through conduit means 22 necessary to maintain the concentration of inerts in the synthesis loop at the maximum level represented by the set point.

A logic flow diagram which can be utilized to calculate the control signal 81, in response to the previously described input signals to the computer means 100, is illustrated in FIG. 2. Symbols previously described and defined in equation I are utilized in the description of FIG. 2. Referring now to FIG. 2, computer means 100 is shown as a dotted line surrounding the flow logic. Signal 55, which is representative of the synthesis gas feed rate FR flowing through conduit means 11, illustrated in FIG. 1, is provided as a first input to the multiplying block 111. Signal 112, which is representative of the gain term $G_1$, is supplied as a second input to the multiplying block 111. Signal 113, which is representative of (FR)($G_1$), is provided from the multiplying block 111 as a first input to the multiplying block 115. The multiplying block 115 is also provided with signal 64, which is representative of the concentration of inerts in the synthesis gas IF flowing through conduit means 11, illustrated in FIG. 1, as a second input. Signal 117, which is representative of (IF)(G$_1$)(FR), is provided as a first input to the subtracting block 119 from the multiplying block 115.

Signal 78, which is representative of the flow rate of the purge PR through conduit means 22, is provided as a first input to the multiplying block 121. Signal 122, which is representative of the gain term G$_2$, is supplied as a second input to the multiplying block 121. Signal 124, which is representative of (PR)(G$_2$), is supplied as a first input to the multiplying block 125 from the multiplying block 121. The multiplying block 125 is also provided with a signal 127 which is representative of the estimated inerts concentration in the synthesis loop at a time n−1 (I$_{n-1}$). Signal 127 is provided as an output from the summing block 129. Signal 131, which is representative of (I$_{n-1}$) (G$_2$)(PR), is provided as a second input to the subtracting block 119.

Signal 132 which is representative of [(IF)(G$_1$)(FR)−(I$_{n-1}$)(G$_2$)(PR)] is provided from the subtracting block 119 as a first input to the multiplying block 134.

Signal 136, which is representative of the gain term G$_3$, is provided as a first input to the multiplying block 137. Signal 138, which is representative of the sample interval SI of the computer means 100, is provided as a second input to the multiplying block 137. Signal 141, which is representative of (SI)(G$_3$), is provided as a first input to the dividing block 143. Signal 144, which is representative of the capacity C of the synthesis loop, is provided as a second input to the dividing block 143. Signal 145, which is representative of (G$_3$)(SI)/C, is provided as a second input to the multiplying block 134 from the dividing block 143.

Signal 147, which is representative of [(IF)(G$_1$)(FR)−(I$_{n-1}$)(G$_2$)(PR)] [(G$_3$)(SI)/C], is provided as a first input to the summing block 129. The output signal 127 from the summing block 129 is fed back to the summing block 129 as a second input. The output signal 127 is representative of the estimated concentration of inerts in the synthesis loop I$_n$.

As has been previously stated, the output signal 127 from the summing block 129 is provided to the multiplying block 125 as a second input and is also provided as an input to the delay block 151 and as a first input to the multiplying block 152. The delay block 151 is utilized to compensate for the difference in the computer sample time and the chromatographic analyzer sample time. The output signal 154 from the delay block 151 is thus representative of signal 127 delayed for the sample time of the chromatographic analyzer which is represented by analyzer transducer 71, illustrated in FIG. 1, and any other delay time such as the delay which is associated with getting the sample from conduit means 18, illustrated in FIG. 1, to the analyzer transducer 71. Signal 154 is provided as a first input to the dividing block 156. The dividing block 156 is also provided with signal 74 which is representative of the actual measured concentration of inerts in the synthesis loop between the compressor means 15 and the synthesis and separation zone 19, illustrated in FIG. 1. Signal 74 is divided by signal 154 in dividing means 156 to provide signal 158 as an output signal. Signal 158 is representative of the ratio between the actual measured value of the concentration of the inerts in the synthesis loop, represented by signal 74, and the estimated value of the concentration of inerts in the synthesis loop at the time the actual measurement was made, represented by signal 154. Signal 158 is provided from the dividing block 156 as an input to the sample and hold (S/H) block 160. The S/H block 152 is activated to provide an output signal 164, which corresponds to signal 158, when the chromatographic analyzer supplying signal 74 provides an update of signal 74 to computer means 100. Signal 164 is provided as a second input to the multiplying block 152. The output signal 159 from the multiplying block 152 is thus representative of the estimated value of the concentration of the inerts in the synthesis loop, which is represented by signal 127, corrected by the actual measurement of the concentration of inerts in the synthesis loop, which is represented by signal 74. Signal 159 is provided as a first input to the flow controller block 161 from the multiplying block 152. The inerts controller block 161 is also provided with a set point signal 162 which is representative of the maximum allowable concentration of inerts in the synthesis loop. The output signal 81 from the inerts flow controller block 161 is responsive to the difference between the set point signal 162 and the signal 159 from the multiplying block 152. Signal 81 is representative of the flow rate of the purge flowing through conduit means 22 required to maintain the concentration of inerts in the synthesis loop at the maximum level represented by set point 162. Signal 81 from flow controller block 161 is provided as the output from the computer means 100 as is illustrated in FIG. 1.

It should be noted that if the estimation of the concentration of inerts in the synthesis loop, which is represented by signal 127, is correct, the signal 158 from the dividing block 156 will be equal to one and the estimation will be utilized as signal 159. Only when the estimation is not correct will the signal 158 provide a correction factor to signal 127. The estimated value, which is represented by signal 127, is utilized to provide a continuous feed forward control of the purge rate for the ammonia synthesis process illustrated in FIG. 1. The actual measurement of the concentration of inerts in the synthesis loop is utilized as a periodic feedback control to correct for any errors in the estimation of the concentration of inerts in the synthesis loop.

EXAMPLE

The following are typical values for process variables in the ammonia synthesis process illustrated in FIG. 1.

| Variable | Typical Value |
| --- | --- |
| % inerts in fresh feed | 1% |
| % inerts in feed to synthesis and separation | 18% |
| Purge rate | 5% of feed rate to synthesis loop |
| Computer sample interval | 6 seconds |
| Chromatographic analyzer sample time | 3 minutes |
| Sample loop dead time | 0–5 minutes |
| % NH$_3$ into separation | 10%–20% |
| % NH$_3$ out of separation | 0–4% |
| Synthesis pressure | 100–600 atm. |

For a purge flow rate of 800 lb-moles/hr the % of inerts in the recycle gas was 16½%. For a purge flow rate of 1040 lb-moles/hr the % of inerts in the recycle gas was 14½%. The ammonia synthesis reaction will typically be quenched when the % of inerts in the feed to the synthesis and separation reaches 20%.

The invention has been described in terms of a preferred embodiment as illustrated in FIGS. 1 and 2. Specific components utilized in the practice of the invention as illustrated in FIG. 1 such as flow sensors 51 and 41, flow transducers 52 and 42, pneumatic control valve 46, control valve 31, current to pressure transducer 48, and flow conroller 43 are each well known, commercially available control components such as are described at length in Perry's Chemical Engineers Handbook, Fourth Edition, Chapter 22, McGraw-Hill.

Other components not previously specified can be as follows:

| A/D converters 54, 63, 73 and 77 | MM53578-bit A/D Converter National Semiconductor |
|---|---|
| Digital to Analog converter 82 | AD 559 8-bit D/A Converter Analog Devices |
| Analyzer transducers 61 and 71 | Process Chromatograph System, Model 102, Applied Automation Inc. Bartlesville, Oklahoma |

For reasons of brevity, conventional equipment such as pumps or additional measurement-control devices have not been included in the above description as they play no part in the explanation of the invention.

While the invention has been described in terms of the presently preferred embodiment, reasonable variations and modifications are possible by those skilled in the art, within the scope of the described invention and the appended claims. Variations such as using an analog computer to perform the required calculations is within the scope of the invention.

That which is claimed is:

1. Apparatus comprising:
   compression means for compressing gases;
   means for passing a stream of fresh synthesis gas containing hydrogen, nitrogen, and a small percentage of inert gases, based on the total volume of said fresh synthesis gas, into said compression means to therein compress said fresh synthesis gas to a suitably high pressure;
   synthesis and separation means for producing ammonia from the thus compressed synthesis gas and for separating ammonia from the synthesis gas which did not react to form ammonia;
   means for passing said compressed synthesis gas to said synthesis and separation means wherein ammonia is separated from the compressed synthesis gas and ammonia is formed from said compressed synthesis gas;
   means for passing at least a portion of the unreacted, compressed synthesis gas and ammonia gas as recycle gas to said compression means to be combined with said fresh synthesis gas and fed to said synthesis and separation means;
   means for purging a portion of said recycle gas;
   means for establishing a first signal representative of an estimate of the concentration of the inert gases in said recycle gas;
   means for establishing a second signal representative of the actual concentration of the inert gases is said recycle gas, said second signal being updated periodically every T seconds;
   means for establishing a third signal representative of the desired purging rate for said recycle gas in response to said first signal and said second signal;
   means for establishing a fourth signal representative of the rate at which said recycle gas is being purged;
   means for comparing said third signal and said fourth signal and for establishing a fifth signal, responsive to the difference between said third signal and said fourth signal; and
   means for manipulating the purging of said recycle gas in response to said fifth signal.

2. Apparatus in accordance with claim 1 wherein said means for establishing said third signal comprises:
   means for delaying said first signal for approximately T seconds to provide a sixth signal representative of said first signal delayed by approximately T seconds;
   means for dividing said second signal by said sixth signal to produce a seventh signal representative of the ratio of said second signal to said sixth signal;
   means for multiplying said first signal by said seventh signal to produce an eighth signal representative of a corrected estimate of the concentration of the inert gases in said recycle gas;
   means for establishing a ninth signal representative of the desired concentration of inert gases in said recycle gas; and
   means for comparing said eighth signal and said ninth signal and for establishing said third signal responsive to the difference between said eighth signal and said ninth signal.

3. Apparatus in accordance with claim 2 wherein said desired concentration of inert gases in said recycle gas is substantially the maximum concentration which will not quench the reaction in said synthesis means.

4. Apparatus in accordance with claim 1 wherein said means for establishing said first signal comprises:
   means for establishing a sixth signal representative of an estimate of the concentration of the inert gases in said recycle gas at a time $T_1$;
   means for establishing a seventh signal representative of the change necessary to make said sixth signal representative of the concentration of the inert gases in said recycle gas at a time $T_2$, said time $T_2$ being later in time than said time $T_1$, $T_2 - T_1$ being less than said T seconds; and
   means for combining said sixth signal and said seventh signal to produce said first signal.

5. Apparatus in accordance with claim 4 wherein said means for establishing said seventh signal comprises:
   means for establishing an eighth signal representative of the flow rate of said stream of synthesis gas passing into said compression means;
   means for establishing a ninth signal representative of the concentration of said inert gases in said stream of synthesis gas passing into said compression means;
   means for multiplying said eighth signal by said ninth signal to produce a tenth signal representative of the flow rate of the inert gases into said compression means;
   means for multiplying said fourth signal by said sixth signal to produce an eleventh signal representative of the flow rate of inert gases being purged;
   means for subtracting said eleventh signal from said tenth signal to establish a twelfth signal representative of the difference in the moles of the inert gases being added by said synthesis gas and the moles of inert gases being purged;
   means for establishing a thirteenth signal representative of the capacity of said synthesis and separation means, said means for passing the thus compressed synthesis gas to said synthesis and separation means, and said means for passing at least a portion of the thus separated, unreacted compressed synthesis gas as said recycle gas said compression means;

means for dividing said thirteenth signal into the time period represented by said time $T_1$ subtracted from said time $T_2$ to establish a fourteenth signal; and means for multiplying said fourteenth signal by said twelfth signal to establish said seventh signal.

6. Apparatus in accordance with claim 5 additionally comprising:

means for establishing a gain term which accounts for the inert gases, if any, which are separated with said ammonia from said unreacted compressed synthesis gas; and means for multiplying said tenth signal by said gain term to thereby compensate for the inert gases in said stream of synthesis gas passing into said compression means which are separated with said ammonia from said unreacted compressed synthesis gas.

7. A method for controlling an ammonia synthesis process comprising the steps of:

passing a stream of fresh synthesis gas, containing hydrogen, nitrogen and a small percentage of inert gases, based on the total volume of said fresh synthesis gas, into a compression zone to compress said fresh synthesis gas to a suitably high pressure;

separating ammonia from the compressed synthesis gas;

passing the compressed synthesis gas to a synthesis zone and therein forming ammonia from part of said synthesis gas;

passing at least a portion of the unreacted, compressed synthesis gas and ammonia gas as recycle gas to said compression zone to be combined with said fresh synthesis gas;

purging a portion of said recycle gas;

establishing a first signal representative of a generally continuous estimate of the concentration of the inert gases in said recycle gas;

establishing a second signal representative of the actual concentration of the inert gases in said recycle gas, said second signal being updated periodically every T seconds;

utilizing said first signal for feed forward control of said purging of a portion of said recycle gas; and utilizing said second signal for feedback control of said purging of a portion of said recycle gas.

8. A method in accordance with claim 7 wherein said step of utilizing said first signal for feed forward control of said purging of a portion of said recycle gas and said step of utilizing said second signal for feedback control of said purging of a portion of said recycle gas comprises:

delaying said first signal for approximately T seconds to provide a third signal representative of said first signal delayed appoximately T seconds;

dividing said second signal by said third signal to produce a fourth signal representative of the ratio of said second signal to said third signal;

multiplying said first signal by said fourth signal to produce a fifth signal representative of a corrected estimate of the concentration of the inert gases in said recycle gas;

establishing a sixth signal representative of the desired concentration of inert gases in said recycle gas;

comparing said fifth signal and said sixth signal and establishing a seventh signal responsive to the difference between said fifth signal and said sixth signal; and manipulating said purging of a portion of said recycle gas in response to said seventh signal.

9. A method in accordance with claim 8 wherein said desired concentration of inert gases in said recycle gas is substantially the maximum concentration which will not quench the reaction in said synthesis and separation zone.

10. A method in accordance with claim 7 wherein said step of establishing said first signal comprises:

establishing a third signal representative of an estimate of the concentration of the inert gases in said recycle gas at a time $T_1$;

establishing a fourth signal representative of the change necessary to make said third signal representative of the concentration of the inert gases in said recycle gas at a time $T_2$, said time $T_2$ being later in time than said time $T_1$, $T_2-T_1$ being less than said T seconds; and combining said third signal and said fourth signal to produce said first signal.

11. A method in accordance with claim 10 wherein said step of establishing said fourth signal comprises:

establishing a fifth signal representative of the flow rate of said stream of synthesis gas passing into said compression zone;

establishing a sixth signal representative of the concentration of said inert gases in said stream of said synthesis gas passing into said compression zone;

multiplying said fifth signal by said sixth signal to produce a seventh signal representative of the flow rate of the inert gases into said compression zone;

establishing an eighth signal representative of the rate at which said recycle gas is being purged;

multiplying said third signal by said eighth signal to produce a ninth signal representative of the flow rate of inert gases being purged;

subtracting said ninth signal from said seventh signal to establish a tenth signal representative of the difference in the moles of the inert gases being added by said synthesis gas and the moles of inert gases being purged;

establishing an eleventh signal representative of the capacity of said ammonia synthesis process;

dividing said eleventh signal into the time period represented by said time $T_1$ subtracted from said time $T_2$ to establish a twelfth signal; and multiplying said twelfth signal by said tenth signal to establish said fourth signal.

12. A method in accordance with claim 11 additionally comprising:

establishing a gain term which accounts for the inert gases, if any, which are separated with said ammonia from said compressed synthesis gas which did not react to form ammonia; and multiplying said seventh signal by said gain term to thereby compensate for the inert gases in said stream of synthesis gas passing into said compression zone which are separated with said ammonia from the compressed synthesis gas which did not react to form ammonia.

* * * * *